US006678001B1

(12) United States Patent
Elberbaum

(10) Patent No.: US 6,678,001 B1
(45) Date of Patent: Jan. 13, 2004

(54) BALL SHAPED CAMERA HOUSING WITH SIMPLIFIED POSITIONING

(75) Inventor: David Elberbaum, Tokyo (JP)

(73) Assignee: Elbex Video Ltd., Tokyo (JP)

( * ) Notice: Subject to any disclaimer, the term of this patent is extended or adjusted under 35 U.S.C. 154(b) by 0 days.

(21) Appl. No.: 09/431,459

(22) Filed: Nov. 1, 1999

(51) Int. Cl.[7] .................................... H04N 5/225
(52) U.S. Cl. .................................... 348/373
(58) Field of Search .................................... 348/373, 374

(56) References Cited

U.S. PATENT DOCUMENTS

| | | | | | |
|---|---|---|---|---|---|
| 3,739,703 | A | * | 6/1973 | Behles | 393/427 |
| 4,320,949 | A | * | 3/1982 | Pagano | 396/427 |
| 4,736,218 | A | * | 4/1988 | Kutman | 396/427 |
| 4,769,711 | A | * | 9/1988 | Date | 348/374 |
| 4,833,534 | A | * | 5/1989 | Paff et al. | 348/151 |
| 4,984,089 | A | * | 1/1991 | Stiepel et al. | 348/143 |
| 5,010,876 | A | * | 4/1991 | Henley et al. | 600/112 |
| 5,032,856 | A | * | 7/1991 | McMinn | 396/427 |
| 5,121,215 | A | * | 6/1992 | Boers et al. | 348/373 |
| 5,221,964 | A | * | 6/1993 | Chamberlain et al. | 348/373 |
| 5,240,220 | A | * | 8/1993 | Elberbaum | 248/558 |
| 5,394,184 | A | * | 2/1995 | Anderson et al. | 348/151 |
| 5,394,209 | A | * | 2/1995 | Stiepel et al. | 396/20 |
| 5,609,561 | A | * | 3/1997 | Uehara et al. | 600/112 |
| 5,818,519 | A | * | 10/1998 | Wren | 348/151 |
| D414,504 | S | * | 9/1999 | Madden | D16/203 |
| 6,061,087 | A | * | 5/2000 | Schieltz et al. | 348/151 |
| 6,262,768 | B1 | * | 7/2001 | Williams | 348/151 |
| 6,354,749 | B1 | * | 3/2002 | Pfaffenberger, II | 396/427 |
| 6,476,856 | B1 | * | 11/2002 | Zantos | 348/151 |

* cited by examiner

*Primary Examiner*—Andrew Christensen
*Assistant Examiner*—Tia M. Harris
(74) *Attorney, Agent, or Firm*—Katten Muchin Zavis Rosenman

(57) ABSTRACT

A television camera apparatus for surveillance applications has a housing including a ball-shaped camera case which has a transparent front portion. An inlet for an electrical cable is provided at the rear end of the camera case. The housing has a rear holder which can be attached and tightened to a structural body such as a electrical box mounted to a surface of a wall or a ceiling and a front cover which can be also attached and tightening of the front cover to the rear holder. Each of the rear holder and front cover has a circular cutout with a curved rim. A curvature diameter of the curved rims of the cutouts is equal to the diameter of the ball-shaped camera case which can be locked between the circular cutouts of the rear holder and the front cover.

24 Claims, 13 Drawing Sheets

BALL SHAPED CAMERA HOUSING WITH SIMPLIFIED POSITIONING

BACKGROUND OF THE INVENTION

1. Field of the Invention

This invention relates to a television camera apparatus used for surveillance applications.

2. Description of the Prior Art

Surveillance television cameras are commonly mounted onto a wall, pole, ceiling or any other fixed base by using an extended arm, known as a camera mount. The extended arm or the camera mount includes a swivel joint, which permits the positioning of the horizontal and vertical axes of the camera in order to direct the camera lens toward its intended observation end. In many cases the television cameras are covered by a housing which is bulky and, as a result, the entire camera assembly becomes large and heavy and this is very disturbing to the architecture of buildings and interiors. For the surveillance of jails and similar institutions that are violent in nature and/or prone to vandalism it is not possible to employ television cameras that are mounted on a mount and a swivel joint because common mounts with swivel joints can be easily tampered with and/or break. Therefore, cameras used for observation of a violent environment are commonly mounted inside a camera housing which is constructed of a thick steel and known as a vandal proof housing. Such camera housings are bolted to walls or ceilings, which limits the positioning of the horizontal and vertical axes of the cameras to within the housing interiors, with the camera positioning particularly restricted by the size of the visible area of the front pane.

Other types of housings, known as explosion proof housings are used for the surveillance of oil fields, refineries and/or similar explosive gaseous environment. Such explosion proof housings are constructed of a very thick steel or other metals and are extremely heavy. The explosion proof housings are further airtight sealed and must be bolted to rugged mounting accessories, which are costly, heavy and time consuming to adjust.

SUMMARY OF THE INVENTION

It is an object of the present invention to provide a housing for a television camera that is vandal proof and/or explosion proof and that permits simple repositioning of its horizontal and vertical axes for observing different scenes.

It is a further object of the present invention to provide a television camera housing that can be partially recessed inside a ceiling, a wall or other plane structures and to maintain its simple repositioning capabilities.

Another object of the present invention is to provide a vandal proof housing and/or an explosion proof housing that is pleasing in its design and is not obstructing the interior designs of buildings.

BRIEF DESCRIPTION OF THE DRAWINGS

The foregoing and other objects and features of the present invention will become apparent from the following description of preferred embodiments of the invention with reference to the accompanying drawings, in which.

DETAILED DESCRIPTION OF THE PREFERRED EMBODIMENTS

Figure 1C:
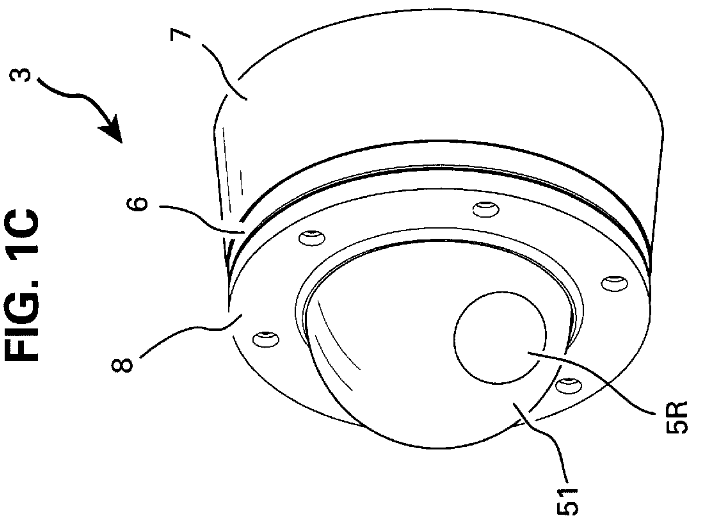
FIGS. 1A, 1B and 1C are perspective views of television camera housing systems of the preferred embodiment of the invention.
Figure 1B:
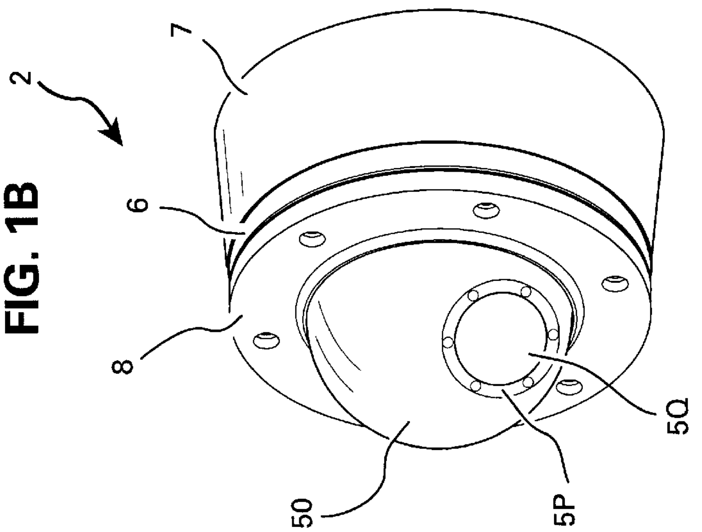
Figure 1A:
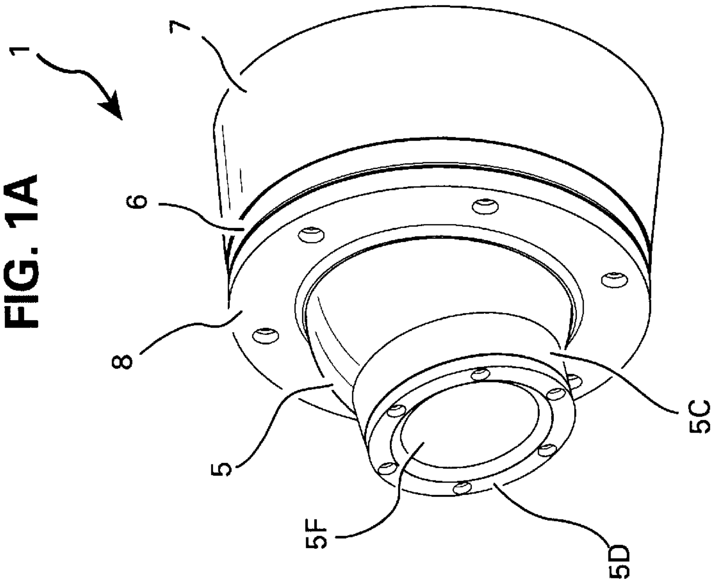
Figure 2A:
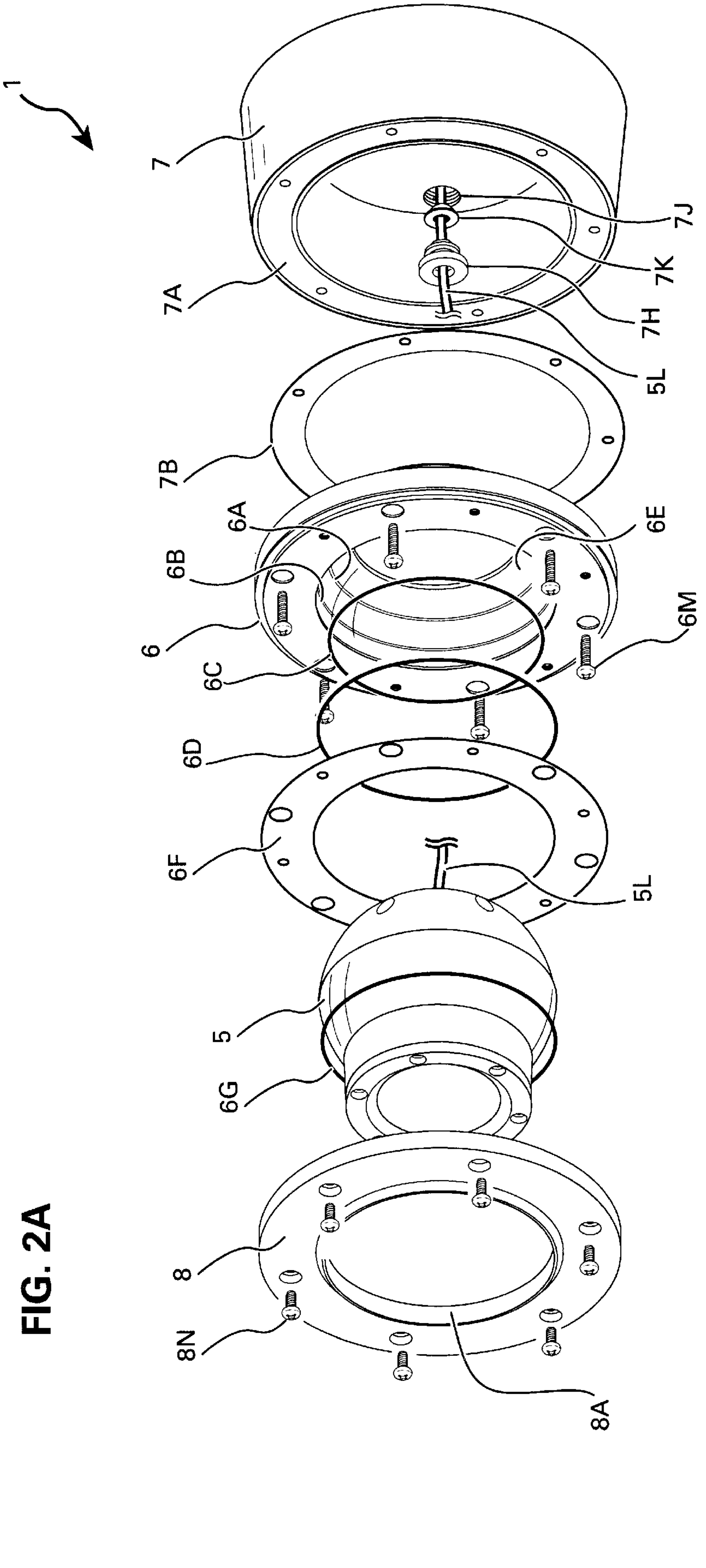
FIGS. 2A, 2B and 2C are exploded views of the camera housing systems of FIGS. 1A, 1B and 1C.

A vandal or explosion proof camera housing system shown in FIG. 1A comprises a camera case that looks like a hemispherical dome 5 comprising a barrel-shaped portion 5C with a transparent pane 5F, while the camera housing systems shown in FIG. 1B and FIG. 1C comprise a camera case that looks like a hemispherical dome 50 or 51 with a transparent pane 5Q or 5R respectively, mounted inside a round, tapered cylindrical base 7 and supported between a holder 6 and a cover 8 shown in FIG. 2A. The base 7 which is fixedly attached to a ceiling or a wall or any other plane provides an electrical cable inlet 7J for feeding power, control, video and other signals for connecting a television camera, or it may be provided instead with a thread for a conduit electrical pipe.

Figure 3A:
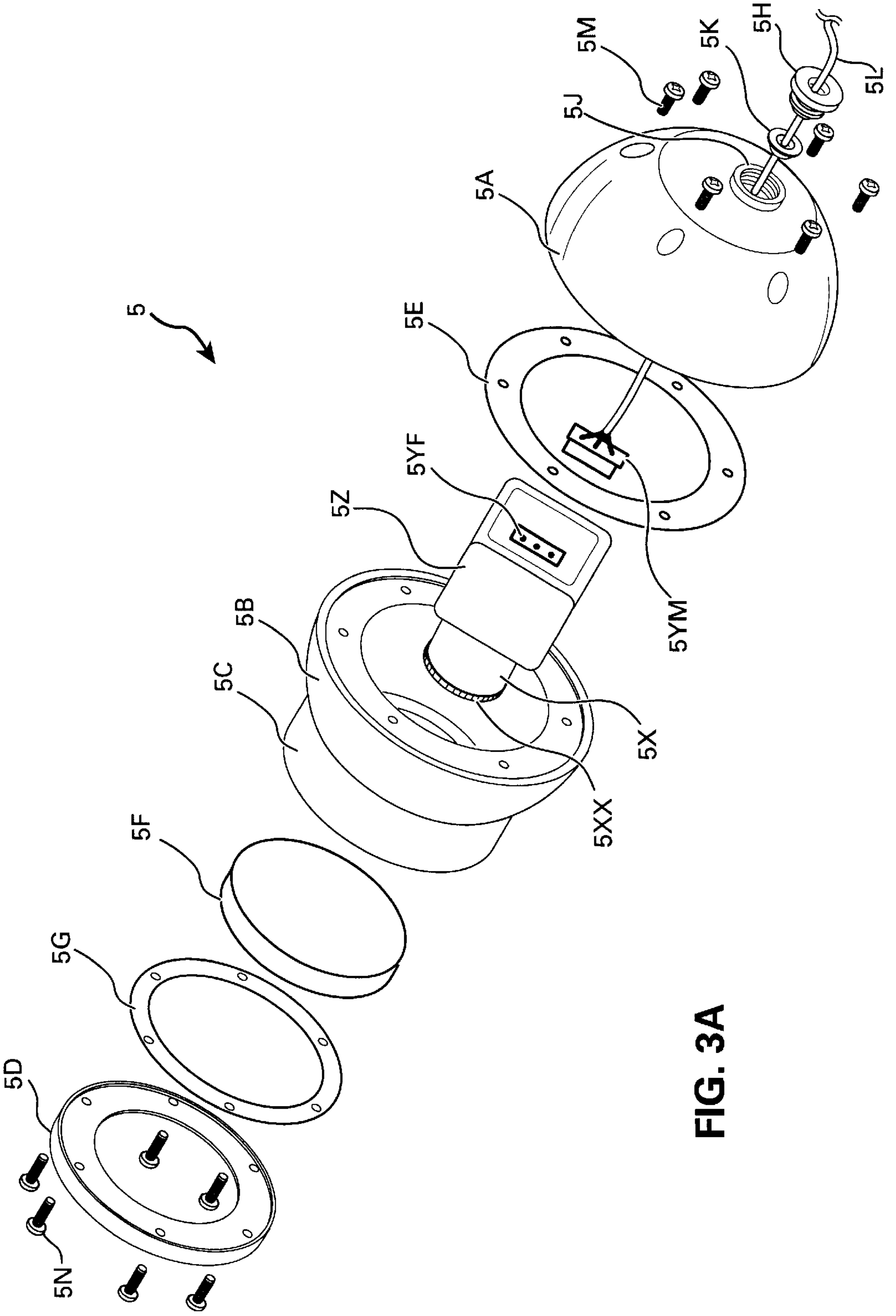
FIGS. 3A, 3B and 3C are exploded views of the camera cases shown in FIGS. 2A, 2B and 2C of the preferred embodiment of the invention.

The holder 6 has a circular cutout having a curved bowl shape 6E with a curvature radius equal to the radius of the camera case outer dimensions and is provided with a seal 7B for sealing the gap between the holder 6 and a rim 7A of the base 7 and grooves 6A and 6B for supporting "O-rings" 6C and 6D respectively, for sealing the gap between the camera case 5 and the curved bowl 6E. The holder 6 is fixedly attached to the rim 7A of the base 7 using screws 6M or other fasteners, and the camera case 5 is placed into the curved bowl 6E of the holder 6 and, as will be explained below, this allows the camera case 5 to be rotatably adjusted inside the holder 6. As shown in FIG. 3A the lower segment 5A of the camera case 5 is provided with a cable inlet 5J, a cable seal 5K and a locking nut 5H to lock the seal onto the cable 5L into the inlet 5J.

The cable inlet 7J of the base 7 shown in FIG. 2A may also be provided with a cable seal 7K and a locking nut 7H to lock the seal 7K onto the cable 5L into the inlet 7J. Therefore when the holder 6 is attached to the base 7 and the camera case 5 is pressured into the bowl 6E of the holder 6 the interior of the base 7 becomes totally sealed.

High grade explosion proof housings require that all cavities should be air-tight sealed and for this reason the seal 6F seals the cavity between the rim 6H of the holder 6 and the cover 8, while the "O-ring" 6G seals the cavity between the cover 8 and camera case 5.

Therefore, when the cover 8 is tightened by the screws 8N or by other fasteners means the camera case 5 is tightly pressured between the circular curved bowl 6E and the circular curved inner rim 8A of the cover 8 which also has a curvature radius equal to the radius of the camera case 5. The tightening of the camera case pressurizes the “O-rings” 6C, 6D and 6G and ensures a perfect air tightness surrounding the camera case cavities and, at the same time, the tightening of the cover grips and locks the camera case into position. Accordingly, the releasing of the screws 8N will loosen the locking grip from the camera case 5 so the camera can be readjusted or redirected toward the scene to be observed.

Figure 2B:
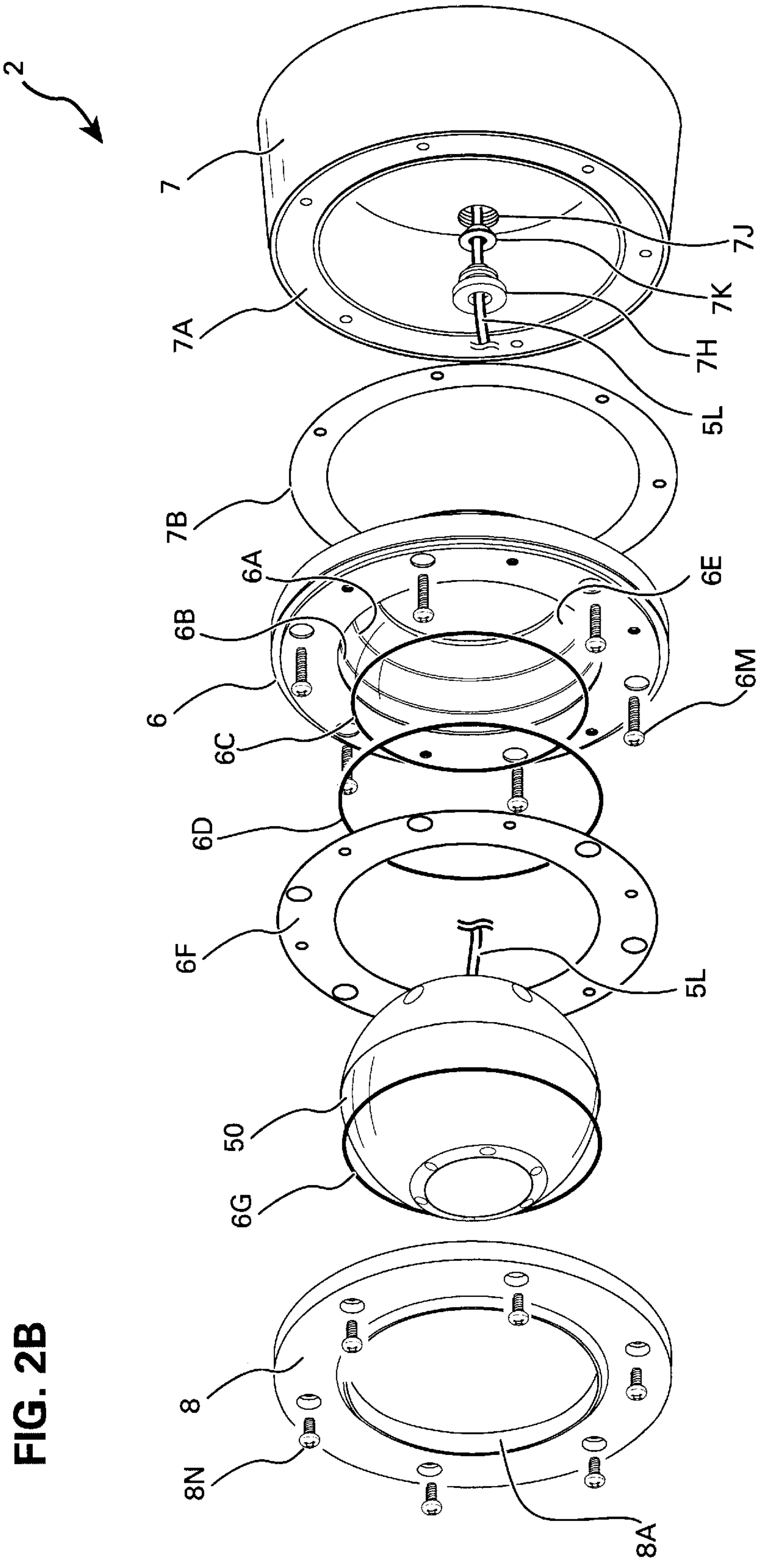
Figure 2C:
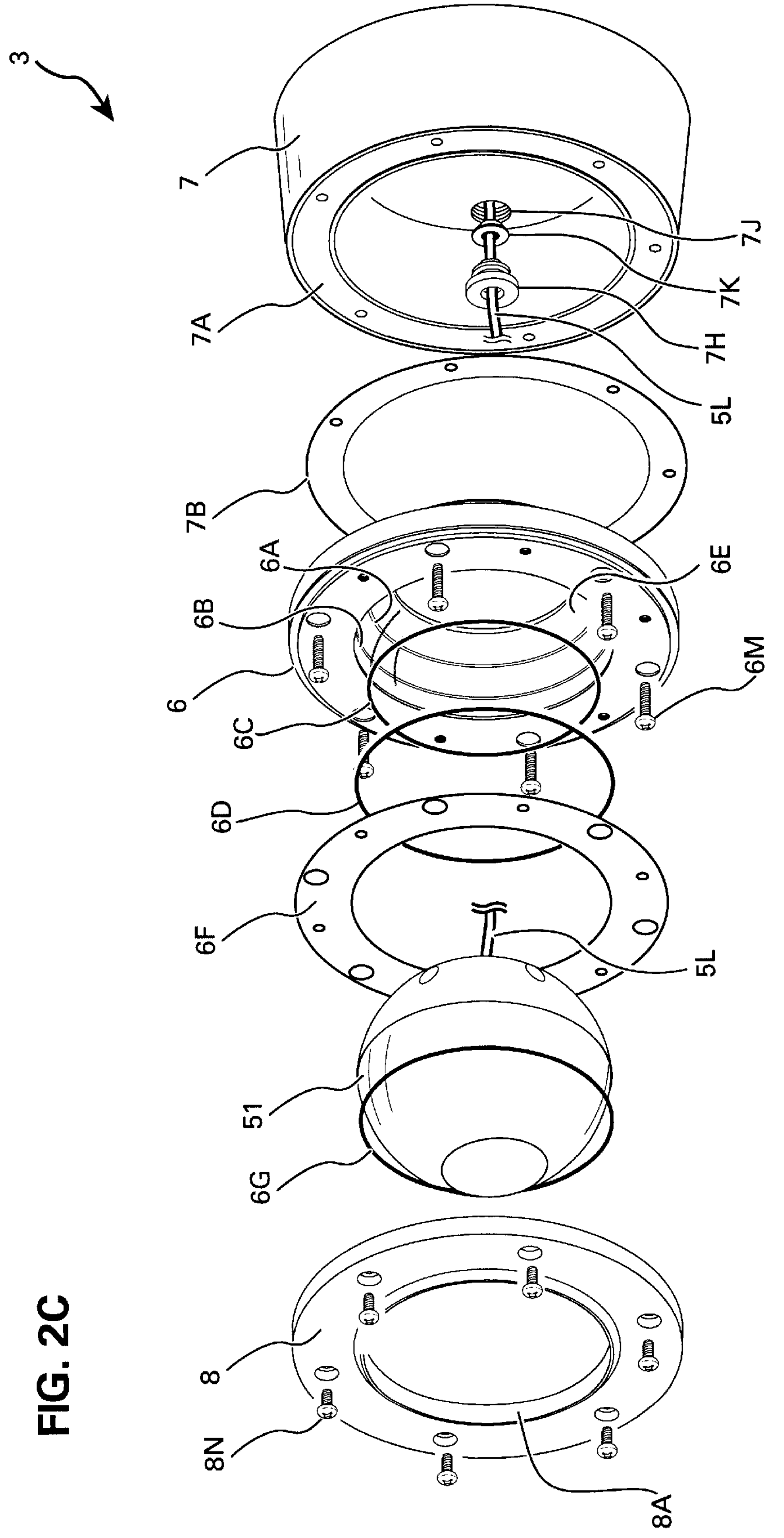

The barrel shape 5C of the camera case 5 provides a cavity inside the camera case for a lens 5X incorporating a focus adjustment ring 5XX which protrudes from the camera body 5Z shown in FIG. 3A; the focus ring 5XX needs to be accessed for focus adjustments and this will be possible by removing the front pane cover 5D, seal 5G and pane 5F. The front pane cover 5P and the pane 5Q of camera case 50 of FIG. 1B and FIG. 2B can also be removed for accessing the focus ring of a lens embodied in the camera body 5ZA shown in FIG. 3B. However, the pane 5R of the camera case 51 of FIG. 1C and FIG. 2C cannot be removed from the outside; therefore a remote motorized focus ring system can be used for remotely adjusting the focus (not shown) or a manual means for adjusting the focus ring through an access at the rear of the camera case 5I is used which will be explained below. Outside these differences, the positioning and locking and/or sealing of the camera cases 5, 50 and 51 are identical as shown in FIG. 2A, FIG. 2B and FIG. 2C, respectively, and as further illustrated in FIGS. 9A and 9B.

Figure 9B:
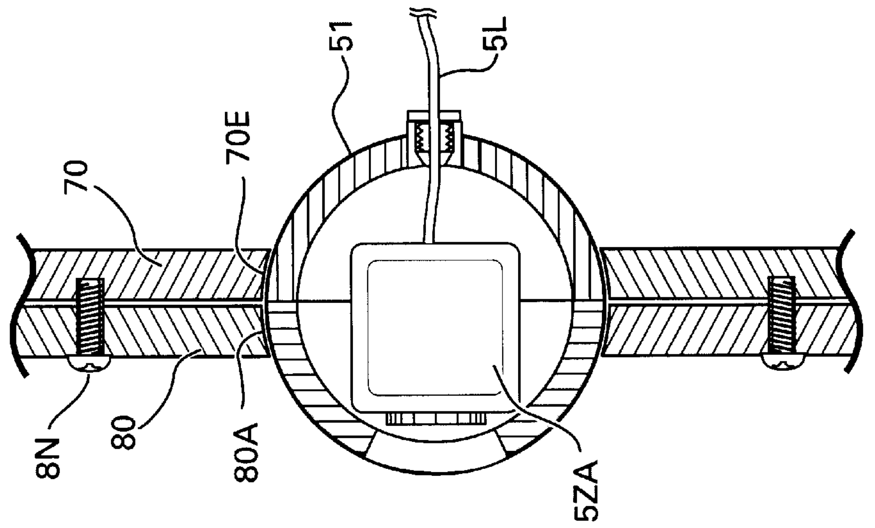
FIGS. 9A and 9B are sectional views showing a locking and sealing method of the television camera housing systems of the present invention.
Figure 9A:
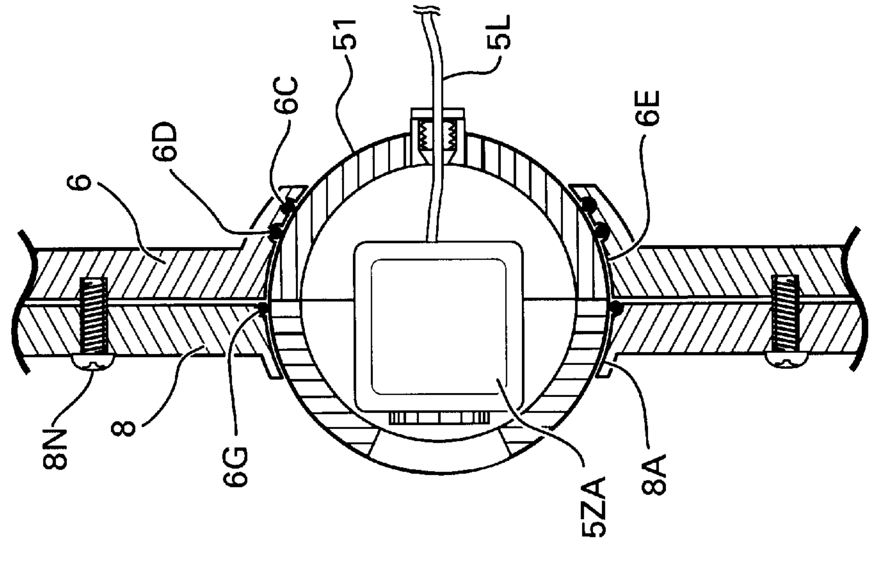

The sectional view of FIG. 9A clearly shows how the “O-rings” 6C, 6D and 6G are pressured against the camera case 5, 50 or 51 and how the tightening of the front cover 8 against the rear holder 6 grips and locks the camera case between the cutout 8A of the front cover 8 and the cutout having a bowl shape 6E of the rear holder 6. The camera case 51 contains a camera 5ZA and an electrical cable 5L is shown in its sealed state. The sectional view of FIG. 9A shows a simplified rear holder 70 and a front cover 80 without the “O-rings” for use with a vandal proof camera housing system that is intended for the indoor installation which does not require air tight or water tight sealing. Moreover, the cutouts 80A and 70A of the front cover 80 and the rear holder 70 are far slimmer and have shorter curves than those of the curved bowl shaped cutout 6E or 8A.

The gripping power upon the camera case 51 shown in FIG. 9B is lesser than the gripping power upon the camera case 51 shown in FIG. 9A. The level of gripping power also depends of the point of engagement between the cutouts 70A and 80A and the camera case 5, 50 or 51. Therefore it is possible to have different gripping power capabilities for the two complementary cutouts 60A and 80A as long as they are gripping the camera case 5, 50 or 51 from the opposite sides of the case centerline.

Even though the camera 51 shown in FIG. 9B is for an indoor use the cable 5L is shown sealed and secured for the purpose of supporting and securing the cable itself.

Observation cameras used indoors and requiring vandal proof housings do not need to be sealed as they are not exposed to rain and can therefore employ the same camera housing systems shown in FIG. 2A, FIG. 2B and FIG. 2C without the use of the different seals 7B, 7K, 6F and without the “O-rings” 6C, 6D and 6G. For both applications, the explosion proof and vandal proof, the need is for the strongest and toughest camera enclosures or camera cases, this is implemented by the use of a ball shape case, which provides the strongest physical structure. The camera case 5, 50 or 51 shown can be made by a metal molding or machining, or by an injection of a strong, tough and non-flammable plastic material.

The camera case 5 shown in FIG. 3A comprises two segments of a bisected ball, with a portion of a barrel shaped 5C at the front portion of the front segment 5B and a flat portion, along with cable inlet 5J at the rear of the rear segment 5A. The seal 5E shown provide the sealing between the rims of both segments, which are attached together using screws 5M or other fasteners. The connecting cable 5L is sealed by the tapered seal 5K, which is lacked onto the cable by the nut 5H. The other side of the cable 5L is terminated with a connector 5YM which is plugged into the connector 5YF of the camera body 5Z and the camera 5Z is secured into place by a well known camera holder (not shown).

The front pane 5F is sealed by the seal 5G and secured into place by the pane cover 5D and the screws 5N. By this the entire camera case becomes air tight sealed.

Figure 3B:
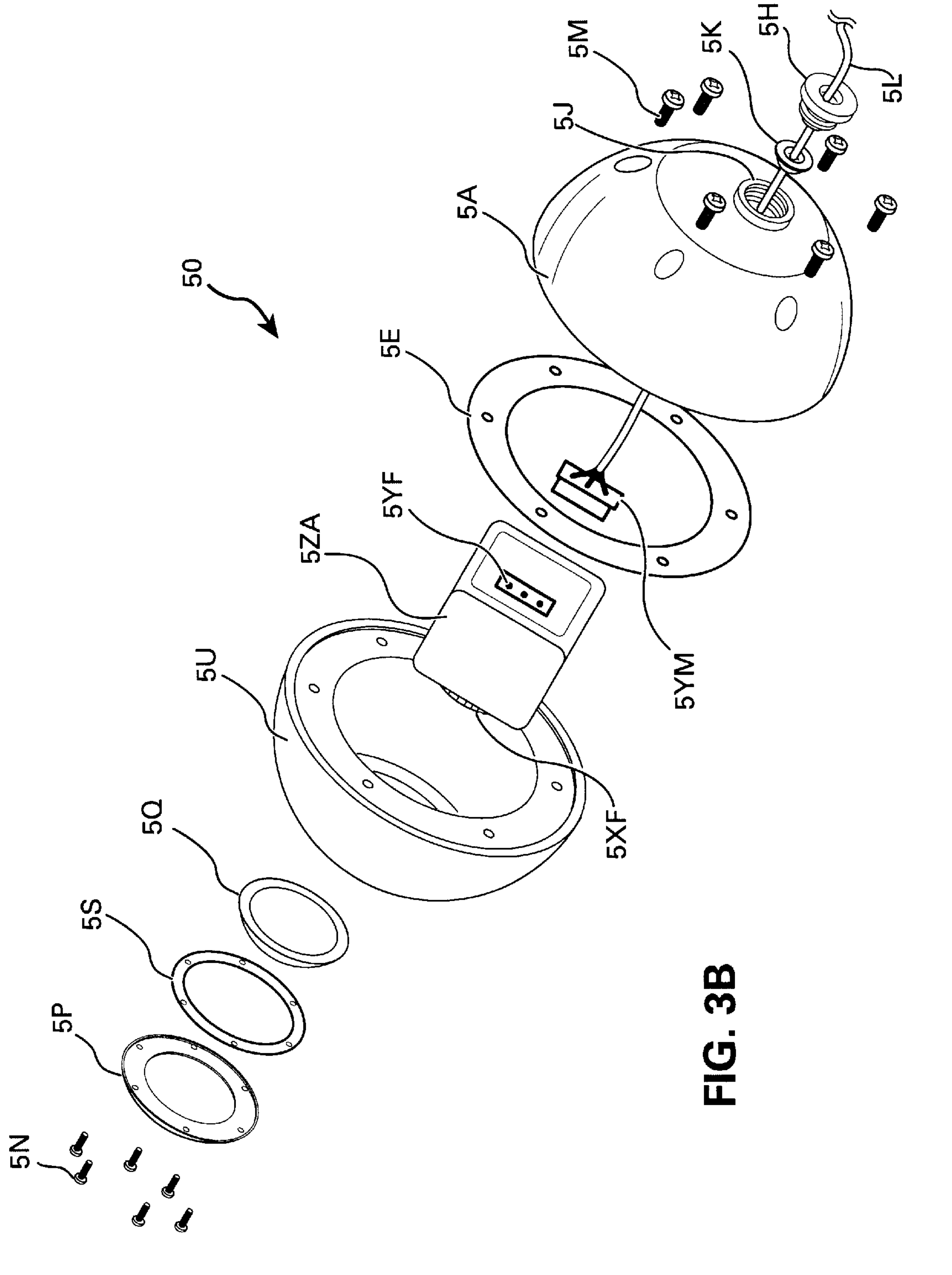

The front segment 5U of the camera case 51 shown in FIG. 3B does not have a barrel shaped front; instead the circular, curved front pane 5Q is sealed by the seal 5S and is attached to the front of the segment 5U by a circular, curved front pane holder 5P and screws 5N or other fasteners. The focus ring 5XF, which is partially shown in FIG. 3B, is a focus ring of a lens imbedded into the camera body 5ZA and it can be accessed from the outside for adjustment of the focus ring by removing the pane holder 5P, the seal 5S and the pane 5Q. The curvature radius of front pane 5Q and the front pane holder 5P is equal to the radius of the camera case 5 and therefore the front surface of the segment 5U appears as a perfect, all rounded semi hemispheric dome. Otherwise the camera case 50 is identical to camera case 5 and is air tightly sealed for use in explosion proof environment or outdoors, at all weather locations, requiring vandal proof camera housing systems. For vandal proof housing mounted indoors the seals 5S, 5E and 5K are not needed and the camera cases 5 and 50 and can be assembled without the seals.

Figure 3C:
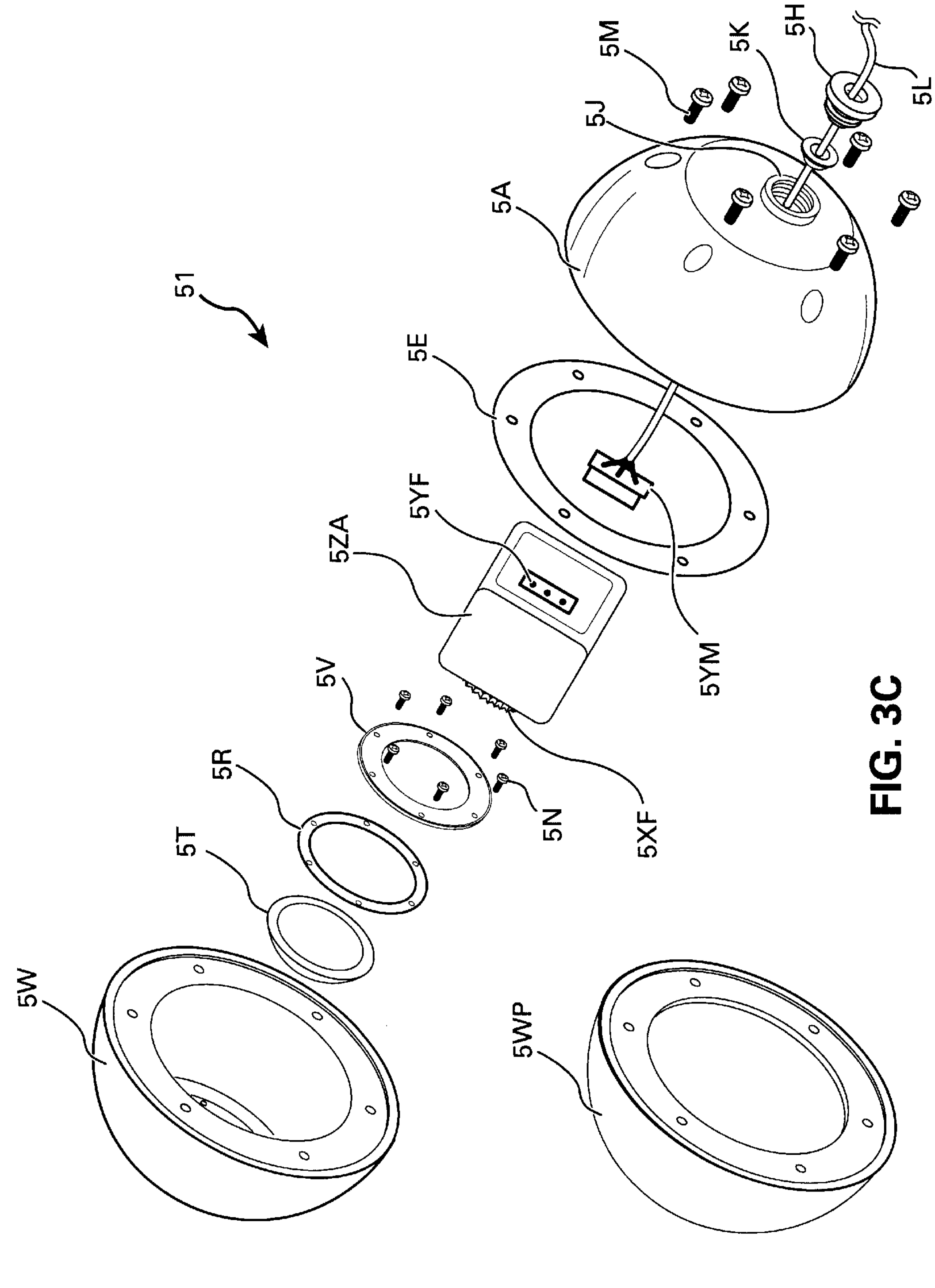

The camera case 51 of FIG. 3C is similar to the camera case 50 with the exception of the front segment 5W, in which the front pane 5T is mounted from the inside of the segment by using the seal 5R and the front pane holder 5V fastened by the screws 5N or other fasteners. By this arrangement the front of the segment 5W and thereby the front of the camera case 51 can be made inconspicuous without pane holder and/or visible screws holding the pane into place. This provides better look for a camera housing system mounted inside well decorated interiors.

Instead of the separated front pane 5T along with the seal 5R, holder 5V and screws 5N it is possible to inject a complete segment 5WP using a very strong and rugged transparent plastic material such as polycarbonate, and thereby transforming the segment body 5WP itself to a front pane. Such transparent material can be tinted or the well known smoked type that does not reveal the interiors of the camera case, i.e., the lens and the camera body cannot be seen from the outside.

Though the camera case 5, 50 and 51 of FIGS. 3, 3A and 3B are shown bisected at their core center, the camera cases can be constructed from more than two segments or can be constructed from two non bisected segments, as long the portions of the camera case that cantact or engage the circular cutout having a curved bowl shape 6E of the holder 6 and the curved inner rim 8A of the cover 8 remain perfectly circular, having a radius equal to the radius of the ball shaped case 5, 50 or 51.

Figure 4:
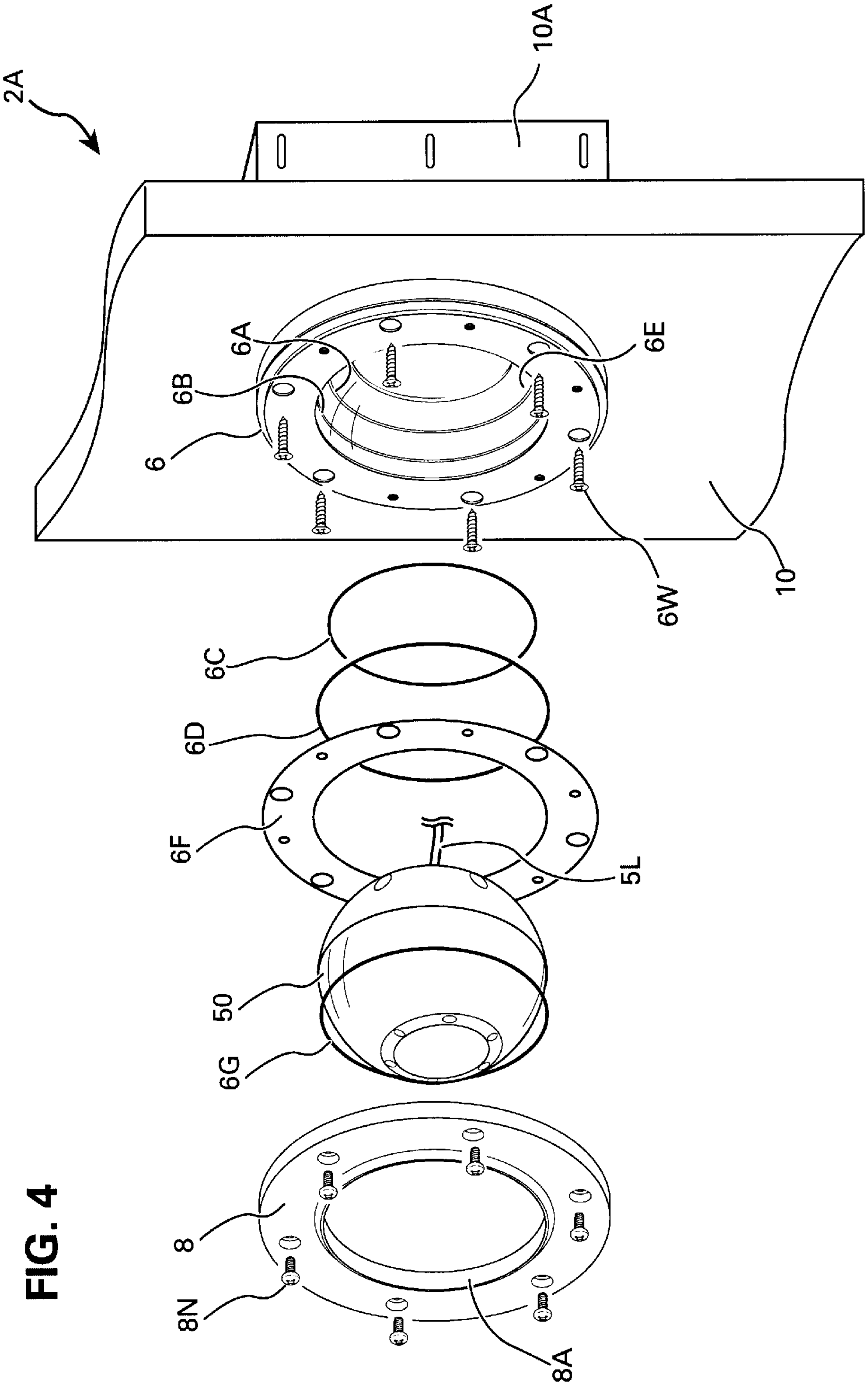
FIG. 4 is an exploded view of a camera housing system of another embodiment of the invention.

The holder 6 shown in FIG. 4 is fixedly mounted onto an opening of a plane 10, such as a wall, using screws 6W or it can be mounted onto an opening of a cover of the recessed electrical box 10A. The box 10A can be a standard recessed electrical box with a cover having an opening large enough to provide for installing the holder 4 flash with the surface of the wall or the plane 10 thereby providing a recessed mounted explosion proof or vandal proof camera housing system.

Though the camera case 50 is shown in FIG. 4 with the camera housing system 2A, the camera cases 5 and 51 shown in FIG. 2A and 2C can also be mounted, sealed and locked into the camera holder 6 of the camera housing system 2A, the same way the camera system 1, 2 and 3 are mounted, sealed and locked into position.

Figure 5:
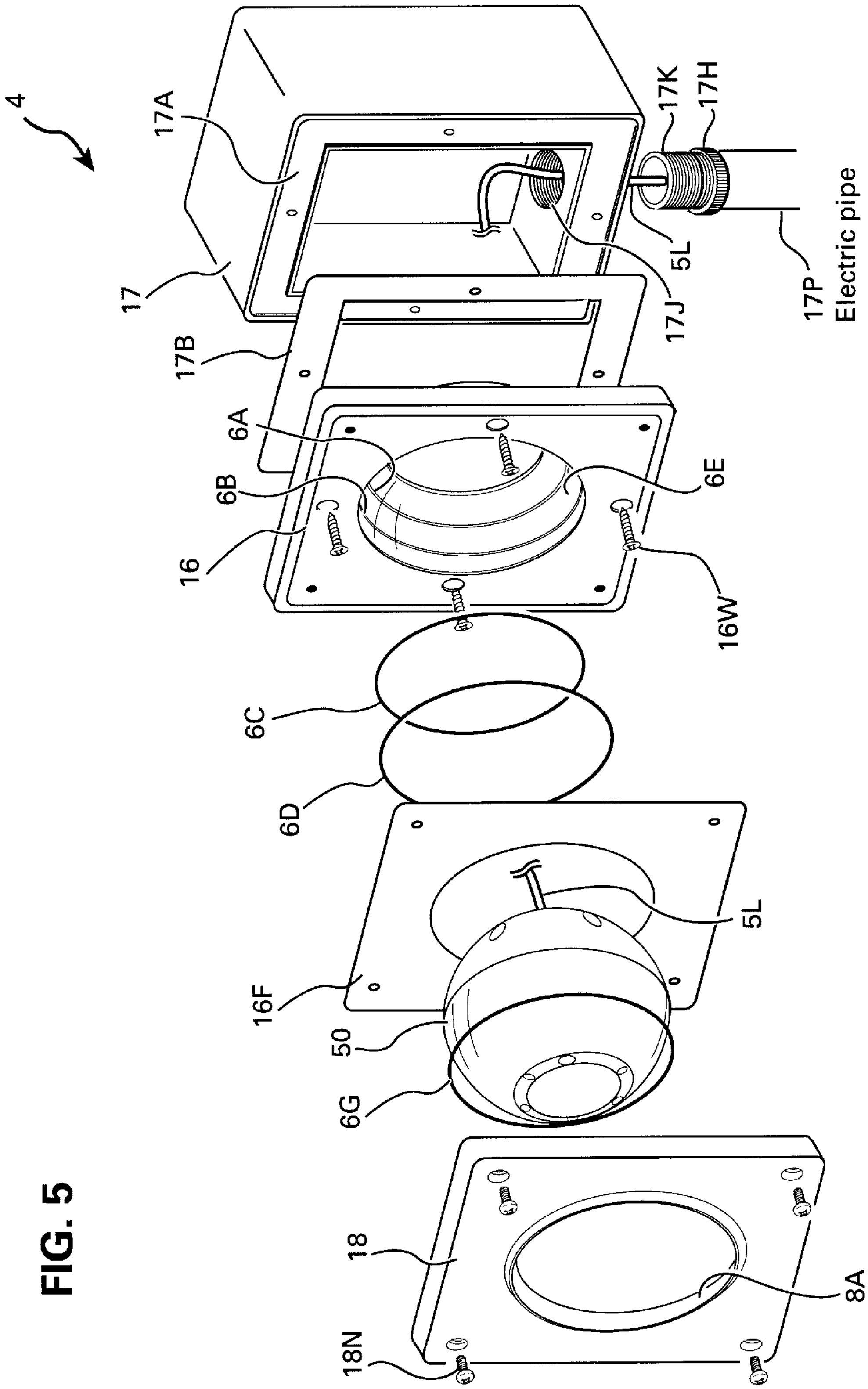
FIG. 5 is an exploded view of a camera housing system of yet another embodiment.

The camera housing system 4 shown in FIG. 5 is similar to the camera housing systems 1, 2 and 3 but with a differently shaped base 17, holder 16 and a cover 18, which are rectangular in their structure versus the round tapered base 7, round holder 6 and round cover 8 of systems 1, 2 and 3 shown in FIGS. 2A, 2B and 2C. The rectangular or a square shaped base comprises a threaded inlet 17J for attaching to it an electrical conduit pipe 17P through its threaded end 17K which can be further secured by the nut 17H. The base 17 can also be recessed into a wall and thereby provide for the holder 16 to be mounted flash with the wall surface.

The rectangular or square holder 16 is attached to the base 17 using the seal 17 and the screws 16W in a similar arrangement as the holder 6 of FIG. 2 is attached to the base 7. The circular cutout in a curved bowl shape 6E of the base 16 is identical to the circular cutout in a curved bowl shape 6E shown in FIG. 2, and the curvature and the size of the inner rim 8A of the cover 18 are identical to the curvature and size of the inner rim 8A of the cover 8 shown in FIG. 2A. Therefore when the cover 18 is attached to holder 16 using the seal 16F and the screws 18N, the camera case 50 shown in FIG. 5 will be pressured and locked into position as well as fully sealed in the same way the camera housing systems 1, 2 and 3 shown in FIGS. 2A, 2B and 2C are sealed and locked. The camera case 5 or 51 of FIGS. 2A and 2C can be used in system 4 of FIG. 5 instead of the camera case 50 shown and can identically be mounted, sealed, and locked into position. Similar to the other camera housing systems, the seals are not needed whenever the camera housings are used in an indoor, vandal proof environment.

Figure 6A:
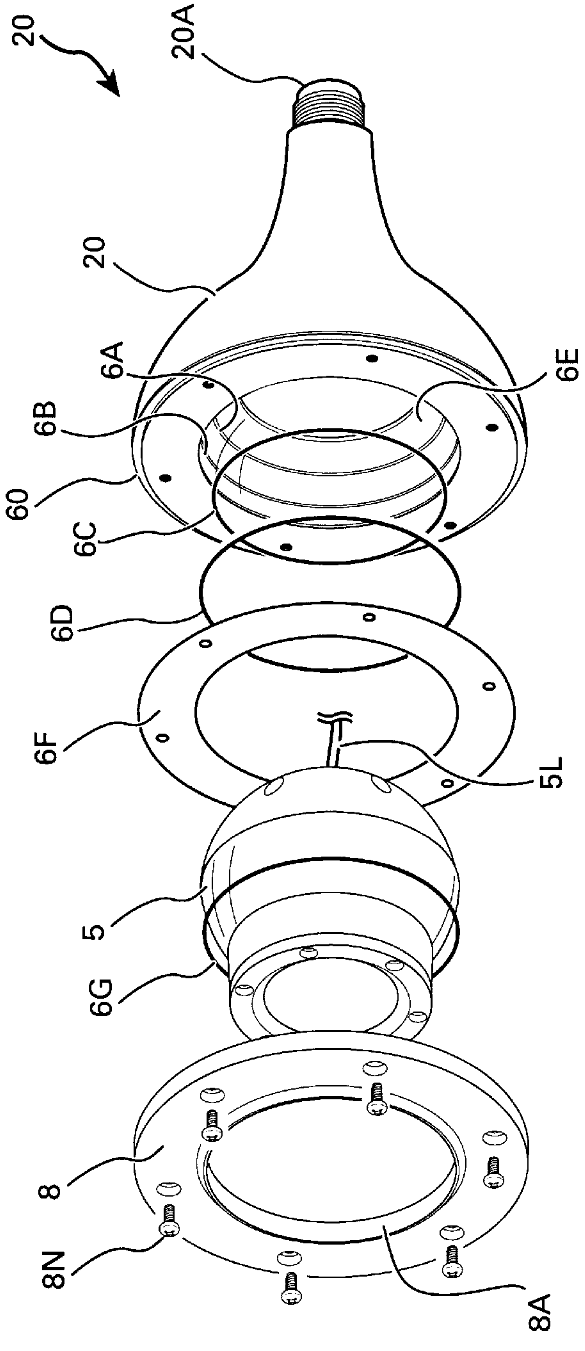
FIGS. 6A and 6B show an exploded view and a perspective view respectively, of a pole or pipe mounted camera housing system of the preferred embodiment.
Figure 6B:
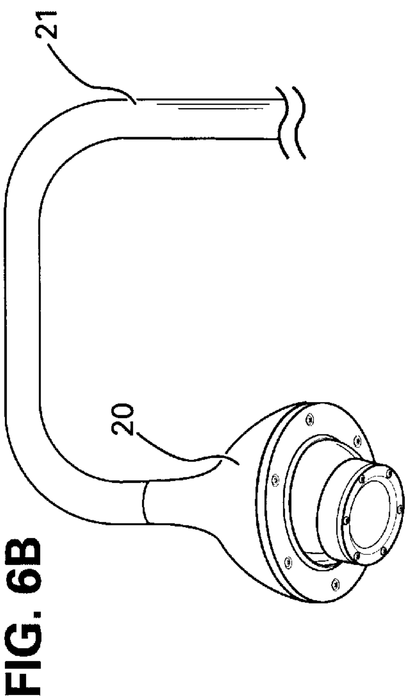

The holder 60 of the camera housing system 20 shown in FIG. 6A is used for attaching the camera housing system to a pole or a pipe 21 shown in FIG. 6B. By this it is possible to eliminate the base and the sealing between the base and the holder. However, depending on the size and shape of the pole or the pipe 21, a base 7 which is provided with a thread (not shown) for attaching it to a pole or a pipe 21 can be introduced. However, attaching the holder 60 itself via its threaded portion 20A to a pole or a pipe 21 reduces the number of parts and simplifies the system installation shown in FIG. 6B. The sealing, positioning and locking of the camera case 5 is identical in every way with the camera housing system 1, 2 or 3 of FIGS. 2A, 2B and 2C. It is obvious that by this arrangement the pole 21 can be air tight sealed and provide strong mechanical support to the camera housing system 20.

Figure 7A:
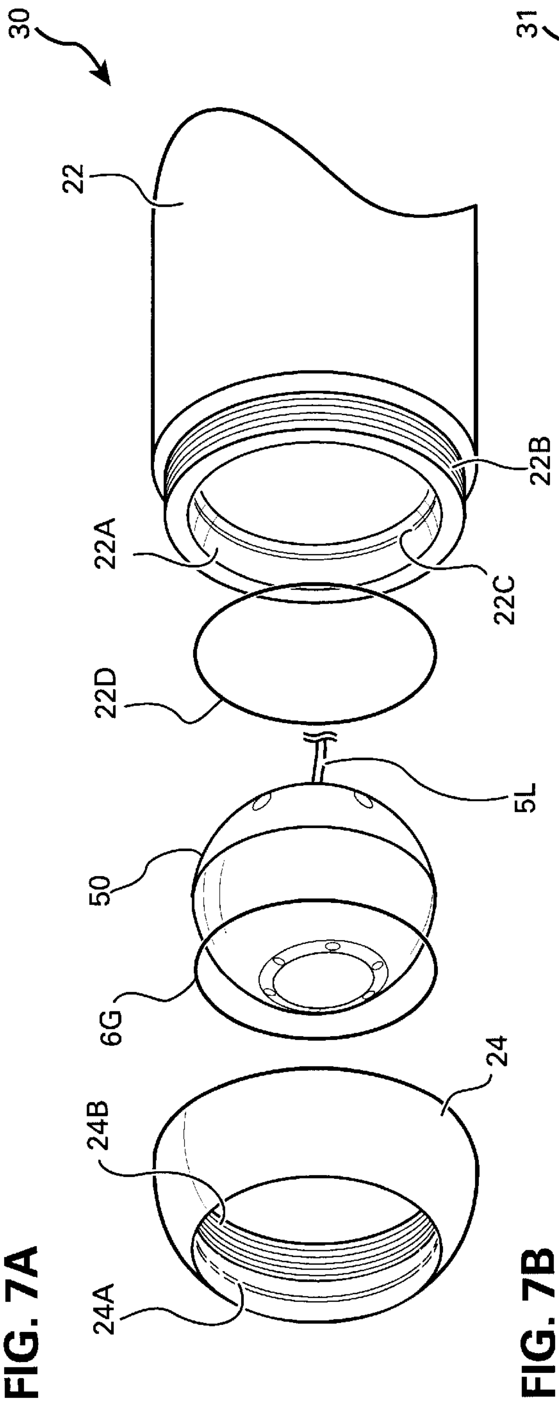
FIGS. 7A and 7B show exploded views of a pole or pipe mounted camera housing system of still another embodiment.
Figure 7B:
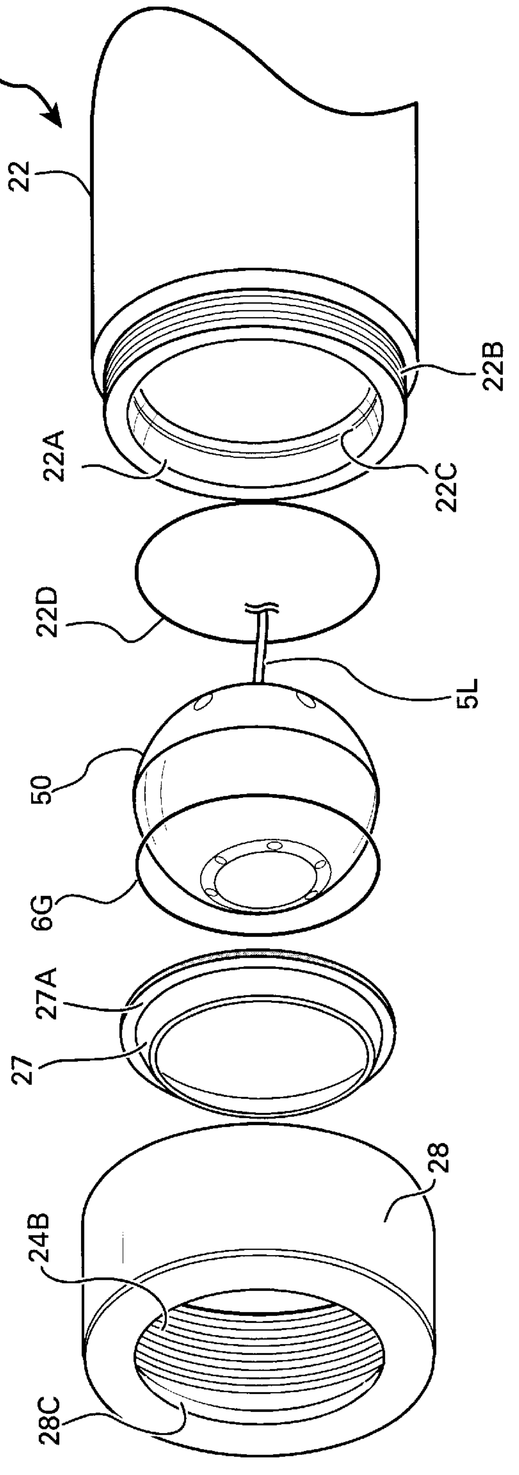

Shown in FIG. 7 is another simplified camera housing system 30 for mounting the camera case 5, 50 or 51 directly onto a pipe or a pole 22 having its inner rim 22A curved into a curvature having a radius equal to the radius of the camera case for perfectly supporting the camera case 5, 50 or 51 and its outer end 22B is threaded to accommodate the thread portion 24B of the retainer nut 24. The inner rim 24A of the retainer nut 24 has a size and curvature equals to size and curvature of the rim 8A of the holder 8 of FIG. 2A and which is equal to the radius of the camera case. The groove 22C supports the "O-ring" 22D, while the "O-ring" 6G is supported by a groove (not shown) in the inner corner of the rim 24A, therefore by tightening the retainer nut 24 onto the pipe 22 the camera case 5, 50 or 51 will be sealed, gripped and locked into position.

The locking by rotation of the retainer nut 24 may grip the camera case 5, 50 or 51 and shift it from its intended direction when the retainer nut is rotated tightly all the way through. For this reason the camera housing system 31 of FIG. 7B comprises a circular curved ring 27 having a flange 27A and a retainer nut 28 having an inner rim 28 that engages the flange 27A of the circular curved ring 27. Such arrangement will allow to tightly lock the circular curved ring 27 onto the camera case 5, 50 or 51 by rotating and tightening the retainer nut 28 against the pipe 22 without causing the nut 28 to grip and/or shift the camera case position.

Figure 8B:
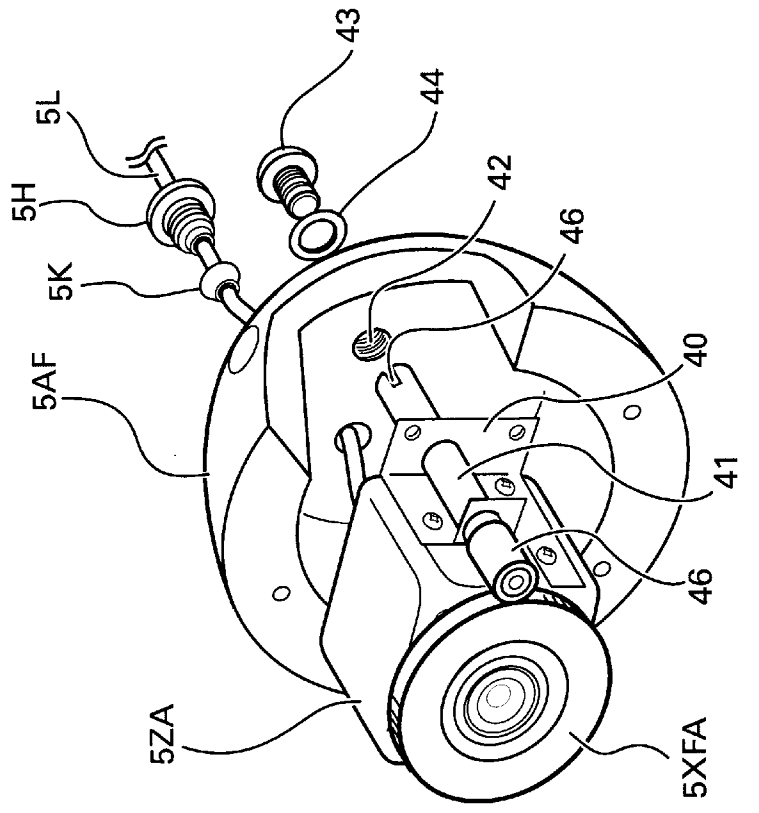
FIGS. 8A and 8B show perspective and exploded views of a rear adjustment of the focus ring of the camera shown in FIG. 3C.
Figure 8A:
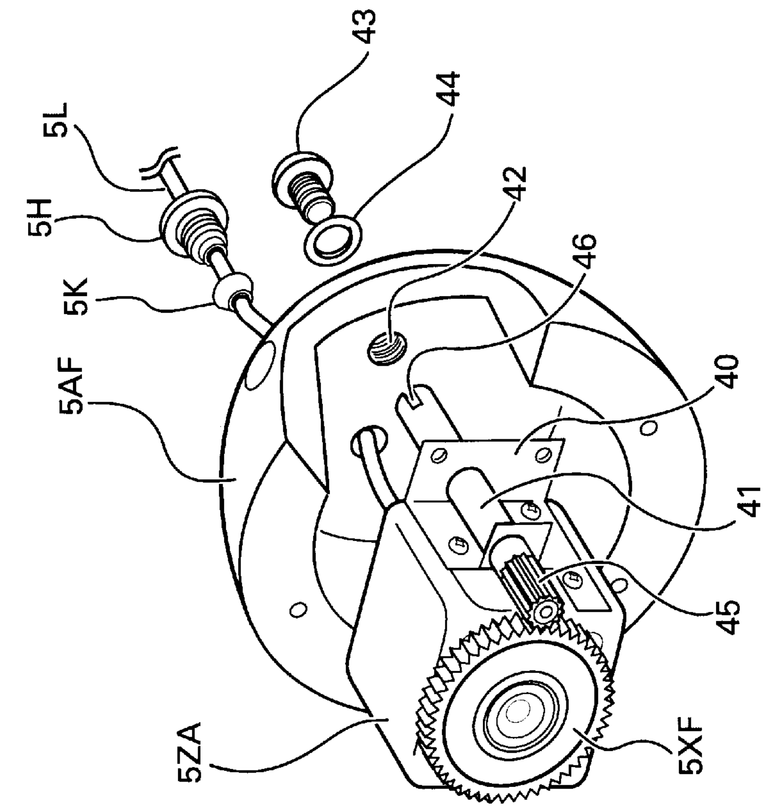

Shown in FIGS. 8 and 8A is camera 5ZA with its focus ring 5XF and 5XFA respectively, having a diameter slightly larger than the width of the camera body. The camera 5ZA comprises a holder 40, a rod 41 extending all the way from the focus ring to the opening 42 in the rear of the segment 5AF which is a modified segment 5A of FIG. 3C having an opening 42 for focus adjustment. The opening 42 provides for accessing the rod from the rear of the camera case 51 by removing the screw 43, which seals along with seal 44 the opening 42. The rod 41 may comprise a gear 45 at its one end for engaging a complementary geared focus ring 5XF, or the rod 40 may comprise a rubber roller 46 to engage the focus ring 5XFA by a roller friction.

The other end of the rod 40 has a slit 44 providing for a screw driver adjustment of the focus ring from the rear end of the camera case 51.

The camera cases 5, 50 and 51 of the camera housing systems 1, 2, 2A, 3, 4, 20, 30 and 31 are shown clearly with their pane visible; however in the actual production of the camera cases, a tinted or smoked pane may be used and the surrounding segments, holders and cover may be applied with a paint that matches the color of the pane, thereby the pane position will not be clearly visible.

It will of course, be understood by those skilled in the art that the particular embodiment of the invention here presented is by way of illustration only, and is meant to be in no way restrictive, therefore, numerous changes and modifications may be made, and the full used of equivalents resorted to, without departing from the spirit or scope of the invention as outlined in the appended claims.

What is claimed is:

1. A camera housing system comprising:

a ball-shaped camera case comprising two bisected ball segments consisting of a front segment and rear segment, and wherein said front segment comprises one of a transparent portion and a semi-transparent portion and said rear segment comprises an inlet for an electrical cable or wires and said one of the transparent portion and said semi-transparent portion is a pane mounted onto said front segment using fasteners that are only accessible from within the inner cavity of said ball-shaped camera case;

a rear holder having a first circular cutout having a first curved rim;

means for attaching said rear holder to a structural body;

a front cover having a second circular cutout having a second curved rim; and means for attaching and tightening said front cover to said rear holder;

wherein a curvature diameter of said first and second curved rims of said first and second cutouts of said rear holder and said front cover, respectively, is equal to a diameter of said ball shaped camera case and wherein said ball-shaped camera case is locked between said first and second cutouts of said rear holder and said front cover or is rotatably adjustable when said tightening is loosened.

2. The camera housing system according to claim 1, further comprising:

a round tubular base for supporting and attaching said rear holder to a wall or a ceiling or to other planes and surfaces, and wherein said rear holder and said front cover are circular and have a matching diameter to said tubular base.

3. The camera housing system according to claim 1, wherein said first cutout of said rear holder is a bowl-shaped cavity having at least one slot for retaining circular seals and wherein a diameter of the curvature of said bowl is equal to a diameter of said ball-shaped camera case.

4. The camera housing system according to claim 1, wherein said cutout of said front cover has at least one slot for retaining a circular seal.

5. The camera housing system according to claim 1, wherein said cutout of said front cover has a seal for sealing a gap between said rear holder and said front cover.

6. The camera housing system according to claim 1, further comprising:

one of a rectangular base and a square base for supporting and attaching said rear holder to a wall or a ceiling or other planes and surfaces, and wherein said rear holder and said front cover are one of rectangular and square and are of a matching size to said one of the rectangular base and the square base.

7. The camera housing system according to claim 1, wherein said ball-shaped camera case is air-tight sealed and wherein said electrical cable inlet is provided with a seal.

8. The camera housing system according to claim 1, wherein said rear holder is provided with a seal for sealing a gap between said rear holder and said structural body.

9. The camera housing system according to claim 2, wherein said round tubular base comprises an electrical cable inlet with one of a seal and an inlet for a conduit electrical pipe.

10. The camera housing system according to claim 6, wherein said one of rectangular and square base comprises an electrical cable inlet with a seal.

11. The camera housing system according to claim 6, wherein said one of rectangular and square base comprises an inlet for a conduit electrical pipe.

12. The camera housing system according to claim 1, wherein said structural body is an electrical box embedded into one of a wall, a ceiling and a pole.

13. The camera housing system according to claim 1, wherein said structural body is an electrical box mounted to a surface of one of a wall, a ceiling and on a surface of other structure.

14. The camera housing system according to claim 1, wherein said rear holder is of a shape similar to one of a bell and a truncated cone and has fastening means at its truncated, rear end for mounting said rear holder onto one of a pole and a pipe.

15. The camera housing according to claim 14, wherein said fastening means is a thread.

16. A camera housing system according to claim 1, wherein said rear holder is one of a pole and a pipe with a curved inner-rim having a curvature radius equal to a radius of said ball-shaped camera case and an outer thread for attaching said front cover, wherein said front cover is a retainer nut with a curved inner rim having a curvature radius equal to the radius of said ball-shaped camera case and a thread complementary to said outer thread of one of said pole and a pipe, and wherein said ball-shaped camera case is locked between said rear holder and said front cover or is rotatably adjustable when said tightening is loosened.

17. The camera housing system according to claim 16, further comprising a circular curved ring with a flanged rim wherein a curvature radius of said circular curved ring is equal to the radius of said ball-shaped camera case and wherein said retainer nut comprises an inner shoulder for engaging said flanged outer rim and wherein said circular ring engages said ball-shaped camera case.

18. A camera housing system comprising:

a ball-shaped camera case comprising two bisected ball segments consisting of a front segment and rear segment, and wherein said front segment comprises one of a transparent portion and a semi-transparent portion and said rear segment comprises an inlet for an electrical cable or wires;

a rear holder having a first circular cutout having a first curved rim;

means for attaching said rear holder to a structural body;

a front cover having a second circular cutout having a second curved rim; and means for attaching and tightening said front cover to said rear holder; wherein a curvature diameter of said first and second curved rims of said first and second cutouts of said rear holder and said front cover, respectively, is equal to a diameter of said ball shaped camera case and wherein said ball-shaped camera case is locked between said first and second cutouts of said rear holder and said front cover or is rotatably adjustable when said tightening is loosened;

wherein said front segment is wholly constructed of one of a transparent material and a semi-transparent material.

19. The camera housing system according to claim 18, wherein said front segment further comprises a barrel-shaped extender for providing a space inside said camera case for a lens.

20. The camera housing system according to claim 1, wherein said fasteners are screws.

21. The camera housing system according to claim 1, wherein said ball-shaped camera case is constructed of two or more segments and wherein portions of at least one of the front and the rear segments of said ball-shaped camera case are truncated providing that said truncated portions will not engage said cutouts of said rear holder and said front cover.

22. The camera housing system according to claim 1, wherein said ball-shaped camera case is constructed of two or more segments and wherein portions of at least one of the front and the rear segments are extended beyond a ball-shaped circumference of said camera case providing that said second extended portions will not engage said first and second cutouts of said rear holder and said front cover.

23. The camera housing system according to claim 1, further having an opening at said rear end of said ball-shaped camera case for enabling adjustment of a focus ring of a lens mounted inside said ball-shaped camera case and a screw with a seal for sealing said opening.

24. The camera housing system according to claim 18, further having an opening at said rear end of said ball-shaped camera case for enabling adjustment of a focus ring of a lens mounted inside said ball-shaped camera case and a screw with a seal for sealing said opening.

* * * * *